US012087238B2

(12) United States Patent
Zhang et al.

(10) Patent No.: US 12,087,238 B2
(45) **Date of Patent: *Sep. 10, 2024**

(54) DISPLAY PANEL AND DRIVING METHOD OF A DISPLAY PANEL

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Mengmeng Zhang, Wuhan (CN); Xingyao Zhou, Wuhan (CN); Yue Li, Wuhan (CN)

(73) Assignees: Wuhan Tianma Microelectronics Co., Ltd, Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,813

(22) Filed: Dec. 28, 2022

(65) Prior Publication Data

US 2023/0162691 A1 May 25, 2023

Related U.S. Application Data

(63) Continuation of application No. 16/730,819, filed on Dec. 30, 2019, now Pat. No. 11,568,825.

(30) Foreign Application Priority Data

Aug. 16, 2019 (CN) ......................... 201910758048.1

(51) Int. Cl.

| | |
|---|---|
| ***G09G 3/3266*** | (2016.01) |
| ***G09G 3/3275*** | (2016.01) |
| ***G09G 3/3283*** | (2016.01) |

(52) U.S. Cl.

CPC ......... *G09G 3/3283* (2013.01); *G09G 3/3266* (2013.01); *G09G 2310/0286* (2013.01); *G09G 2310/08* (2013.01)

(58) Field of Classification Search

CPC . G02F 1/133; G02B 27/01; G06F 3/01; G06F 15/00; G09G 3/20; G09G 3/32;

(Continued)

(56) References Cited

U.S. PATENT DOCUMENTS

2008/0291223 A1* 11/2008 Yamazaki ............ G09G 3/3677 345/690
2011/0292008 A1* 12/2011 Iwabuchi ............ G09G 3/3291 345/204

(Continued)

FOREIGN PATENT DOCUMENTS

| | | |
|---|---|---|
| CN | 101496089 A | 7/2009 |
| CN | 102013230 A | 4/2011 |

*Primary Examiner* — Chanh D Nguyen
*Assistant Examiner* — Nguyen H Truong
(74) *Attorney, Agent, or Firm* — KDW Firm PLLC

(57) ABSTRACT

Provided are a display panel and a driving method for a display panel. The display panel includes multiple levels of shift registers which are cascaded, a clock signal line and a trigger signal line. The display panel comprises a current display mode which comprises a current FPS, a current trigger signal and a current clock signal, where the current FPS is the same as a refresh frequency of the current trigger signal. The display panel further comprises a reference display mode which comprises a reference FPS, a reference trigger signal and a reference clock signal. An effective action duration of the current trigger signal comprises a first stage, and in the first stage, a pulse width of the current clock signal is the same as a pulse width of the reference clock signal. The current FPS is less than a reference FPS in the reference display mode.

19 Claims, 14 Drawing Sheets

(58) Field of Classification Search
CPC ...... G09G 3/36; G09G 3/3233; G09G 3/3266; G09G 3/3283; G09G 5/00; G09G 5/10; H04N 7/01; H04N 5/00; H04N 5/74
See application file for complete search history.

(56) References Cited

U.S. PATENT DOCUMENTS

| | | | | |
|---|---|---|---|---|
| 2013/0286058 | A1* | 10/2013 | Umezaki | G09G 3/3648 345/88 |
| 2016/0155409 | A1* | 6/2016 | Jeoung | G09G 3/3696 345/214 |
| 2018/0040305 | A1* | 2/2018 | Lee | G09G 5/003 |
| 2020/0027414 | A1* | 1/2020 | Aoki | G09G 3/3614 |
| 2021/0056926 | A1* | 2/2021 | Koo | G09G 3/2092 |
| 2021/0193054 | A1* | 6/2021 | Kwon | G09G 3/3258 |
| 2022/0277694 | A1* | 9/2022 | Jeon | G09G 3/3266 |

* cited by examiner

DISPLAY PANEL AND DRIVING METHOD OF A DISPLAY PANEL

CROSS-REFERENCES TO RELATED APPLICATIONS

This is a Continuation application of U.S. patent application Ser. No. 16/730,819, filed Dec. 30, 2019, which claims priority to Chinese Patent Application No. 201910758048.1 filed Aug. 16, 2019, the disclosures of which are incorporated herein by reference in their entireties.

TECHNICAL FIELD

The present disclosure relates to the field of display technology, in particular, to a display panel and a driving method of a display panel.

BACKGROUND

With increasing development of display technology, users have gradually increased demands for display effect of a display panel and a display device. The display panel may include pixels arranged in an array, each of the pixels is provided with a pixel driving circuit. The pixel driving circuit is used for controlling display brightness of the pixel and achieving a color display and a white display of the display panel based on the color of the light emitted.

In general, the pixel driving circuit may include a switching transistor and a storage capacitor. During a period in which a scan signal is enabled, that is, during a period in which the switching transistor is turned on, the storage capacitor is charged so that the pixel maintains a preset brightness during a period of a frame. When it is required to switch to a different scan frequency (which may be called as a frame refresh frequency, or called as a frame rate), data corresponding to the frame refresh frequency needs to be downloaded, causing a change on the display screen (for example, a flicker may occur on the display panel) and resulting in poor user experience.

SUMMARY

The present disclosure provides a display panel and a driving method of a display panel capable of switching the frame refresh frequency from a high frequency to any low frequency without changing a clock signal. Thus, the influence of frequency switching on the display screen may be avoided, and the user experience is improved.

In the first aspect, the present disclosure provides a display panel. The display panel includes a plurality of levels of shift registers which are cascaded, a clock signal line configured to transmit a clock signal and a trigger signal line configured to transmit a trigger signal. The clock signal line is connected to the plurality of levels of shift registers, one terminal of the trigger signal line is electrically connected to a shift register at one level, and another terminal of the trigger signal is electrically connected to an integrated circuit. The display panel comprises a current display mode, and the current display mode comprises a current frames per second (FPS), a current trigger signal corresponding to the current FPS and a current clock signal corresponding to the current FPS, where the current FPS is the same as a refresh frequency of the current trigger signal. The display panel further comprises a reference display mode, and the reference display mode comprises a reference FPS, a reference trigger signal corresponding to the reference FPS and a reference clock signal corresponding to the reference FPS. An effective action duration of the current trigger signal comprises a first stage, and in the first stage, a pulse width of the current clock signal is the same as a pulse width of the reference clock signal. The current FPS is less than a reference FPS in the reference display mode.

In the second aspect, the present disclosure provides a driving method of a display panel. The display panel includes a plurality of pixels, a plurality of levels of shift registers which are cascaded, a clock signal line configured to transmit a clock signal and a trigger signal line configured to transmit a trigger signal, a clock signal line and an inverted clock signal line; the clock signal line is connected to the plurality of levels of shift registers, one terminal of the trigger signal line is electrically connected to a shift register at one level, and another terminal of the trigger signal is electrically connected to an integrated circuit; the trigger signal line is connected to a shift register at a first level, and both the clock signal line and the inverted clock signal line are connected to each of the plurality of levels of shift registers. The method comprises steps described below.

A current frames per second (FPS) in a current display mode is acquired.

A current trigger signal and a current clock signal of the shift register are determined according to the current FPS.

The shift register at the one level is provided with the determined current trigger signal and the determined current clock signal. A refresh frequency of the current trigger signal is the same as the current FPS. At least within an effective action duration of the current trigger signal, a pulse width of the current clock signal is the same as a pulse width of a reference clock signal in a reference display mode, and spacing between two adjacent pulses in the current clock signal is the same as spacing between two adjacent pulses in the reference clock signal; and the current FPS is less than or equal to a reference FPS in the reference display mode.

The display panel provided by the present disclosure includes a plurality of levels of shift registers which are cascaded, a clock signal line configured to transmit a clock signal and a trigger signal line configured to transmit a trigger signal. The clock signal line is connected to the plurality of levels of shift registers, one terminal of the trigger signal line is electrically connected to a shift register at one level, and another terminal of the trigger signal is electrically connected to an integrated circuit. The display panel comprises a current display mode, and the current display mode comprises a current frames per second (FPS), a current trigger signal corresponding to the current FPS and a current clock signal corresponding to the current FPS, wherein the current FPS is the same as a refresh frequency of the current trigger signal. The display panel further comprises a reference display mode, and the reference display mode comprises a reference FPS, a reference trigger signal corresponding to the reference FPS and a reference clock signal corresponding to the reference FPS. An effective action duration of the current trigger signal comprises a first stage, and in the first stage, a pulse width of the current clock signal is the same as a pulse width of the reference clock signal. The current FPS is less than a reference FPS in the reference display mode.

At the same time, since the current clock signal remains the same as the reference clock signal at least within the effective action duration of the current trigger signal, and a pulse width of a scan signal is based on the clock signal, the pulse width of the scan signal in the current display mode and the pulse width of the scan signal in the reference display mode may be ensured to be the same. Since the pulse width of the scan signal in the current display mode is the same as the pulse width of the scan signal in the reference display mode, the display brightness of the pixel in the display panel is substantially unchanged. Thus, the current display mode and the reference display mode may share the related data of brightness adjustment. Therefore, the current display mode may utilize data signals in addition to the reference trigger signal in the reference display mode, that is, the data corresponding to the FPS in the current display mode does not need to be downloaded. Thus, the effect on the display screen is relatively less, and the user experience can be improved.

DETAILED DESCRIPTION

Figure 1:
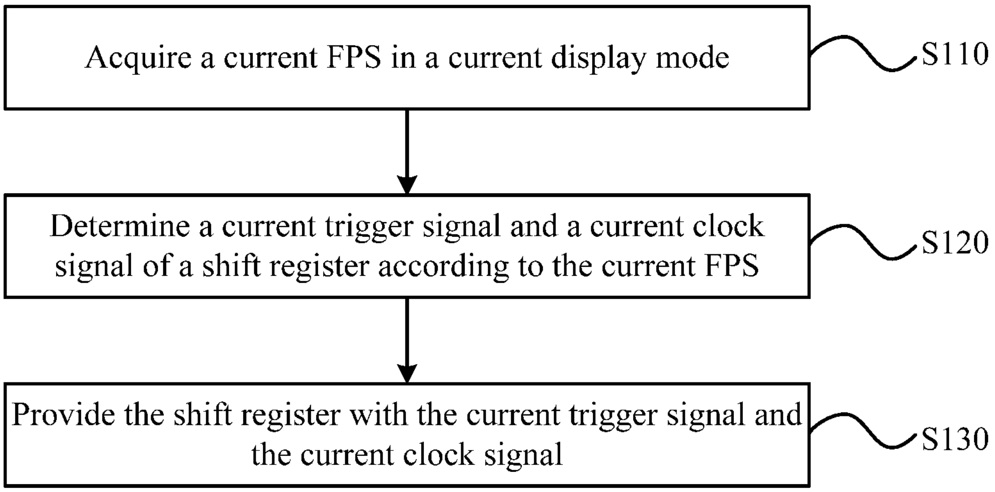
FIG. 1 is a flowchart of a driving method of a display panel provided by an embodiment of the present disclosure.

The present disclosure will be further described in detail hereinafter in conjunction with the drawings and embodiments. It may be understood that the specific embodiments described herein are used only for interpreting the present disclosure and not for limiting the present disclosure. In addition, it should be noted that, for ease of description, the drawings only show a part related to the present disclosure, not the whole structure of the present disclosure.

During a display process of a display panel, the FPS determines a refresh rate of a display screen. The higher the FPS, the higher the refresh rate of the display screen, that is, the more frequently the display screen is switched. Taking an Organic Light-Emitting Diode (OLED) display panel as an example, two sets of timing sequence, two sets of gamma data and two sets of demura data need to be provided for the FPS of 60 Hz and the FPS of 90 Hz. When the OLED display panel operates at 60 Hz, the timing sequence and data corresponding to 60 Hz need to be downloaded. When the display panel operates at 90 Hz, the timing sequence and data corresponding to 90 Hz need to be downloaded.

Thus, when the display is switched between the FPS of 60 Hz and the FPS of 90 Hz, it is necessary to provide and adaptively download the timing sequence and data corresponding to respective FPSs. When the user requires a display panel to be used at more FPSs, such as FPS of 60 Hz, 90 Hz, 120 Hz and 144 Hz, it is needed to provide a set of timing sequence and data for respective FPS respectively. The timing sequence may include timing of a scan signal (which may also be called as a scan pulse signal or a scan timing sequence signal). A variation of a pulse width of the scan signal has a great effect on the display brightness of the pixel. Generally, the pulse width of the scan changes when the FPS is switched. At this time, data voltage needs to be correspondingly adjusted, that is, a corresponding gamma data set needs to be provided. Thus, it is necessary to perform gamma debugging corresponding to respective FPSs. This process takes a long time, resulting in a significant increase in time cost. Meanwhile, when it is required to switch to another FPS, the timing sequence and data (including the gamma data and the demura data) corresponding to the FPS need to be downloaded, thereby causing abnormal display and resulting in poor user experience.

In view of the above problems, an embodiment of the present disclosure provides a driving method of a display panel, a display driving device and an electronic apparatus. With respect to different FPSs, the refresh frequency of the trigger signal is consistent with the FPS, and the clock signals of the shift register are the same at least within the effective action duration of the trigger signal, so that the pulse width of the scan signal maintains the same at different FPSs. Thus, the gamma data and the demura data at different FPSs may be shared. Therefore, only one set of data needs be downloaded and used at different FPSs, and only one gamma adjustment is performed. Thus, the time consumption of the gamma adjustment is greatly shortened, and the time cost is reduced. Meanwhile, it is not required to download the data when the FPS is switched. Thus, the abnormal display is avoided, and the user experience is improved.

A driving method of a display panel, a display driving device and an electronic apparatus provided by the embodiment of the present disclosure will be described hereinafter in conjunction with FIG. 1 to FIG. 18.

Figure 2:
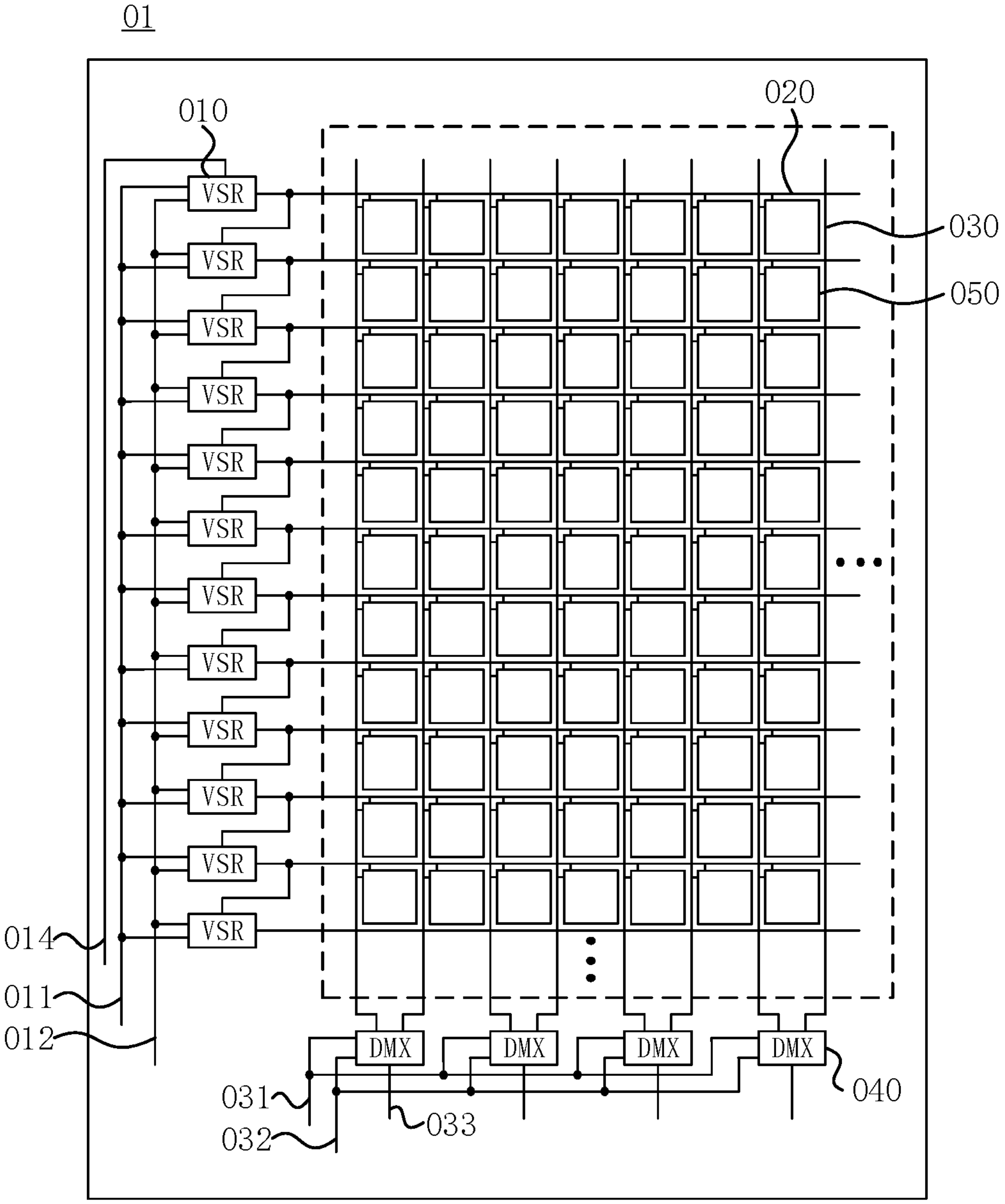
FIG. 2 is a structural diagram of a display panel provided by an embodiment of the present disclosure.
Figure 3:
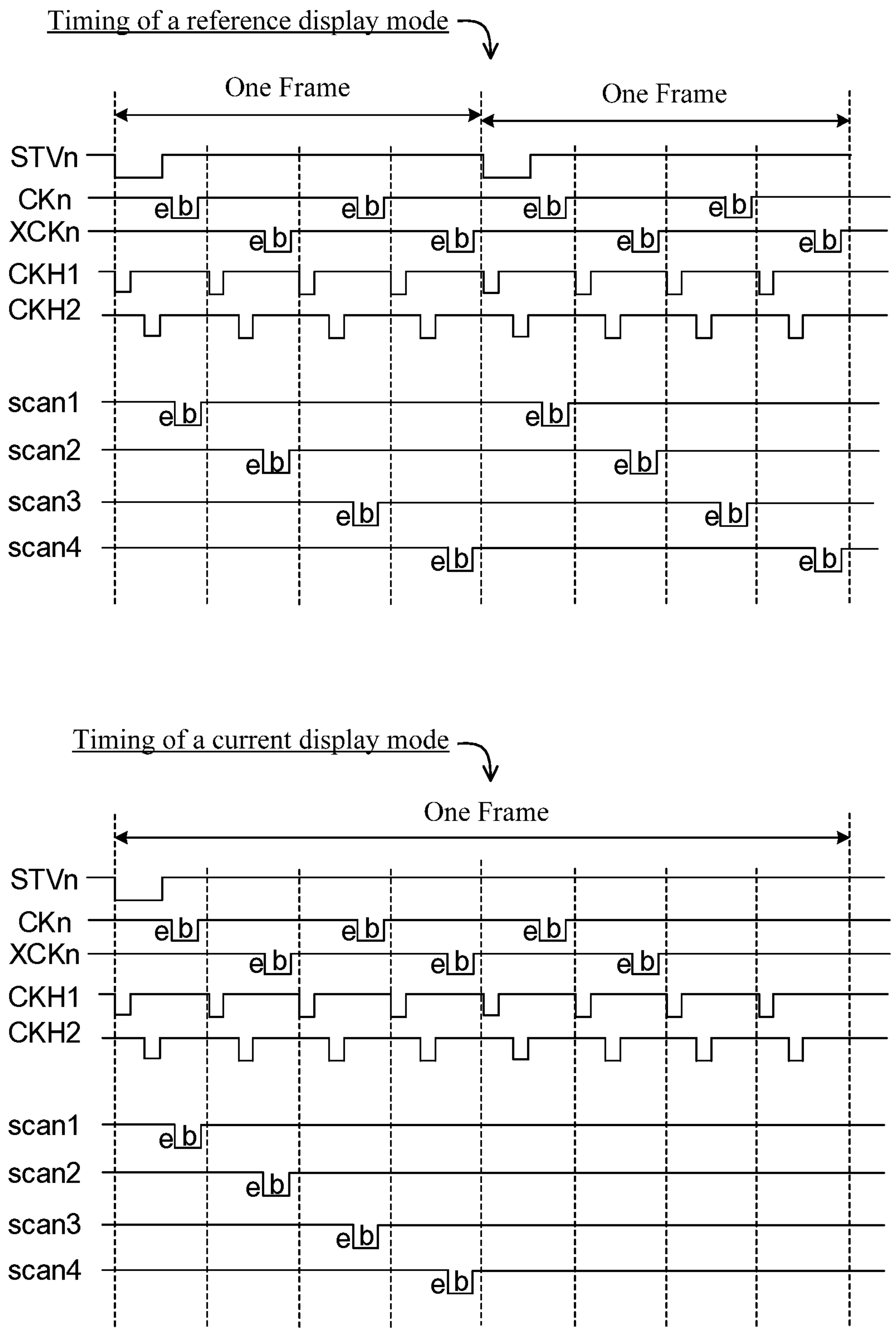
FIG. 3 is a timing sequence diagram of a driving method provided by an embodiment of the present disclosure.

For example, FIG. 1 is a flowchart of a driving method provided by an embodiment of the present disclosure. FIG. 2 is a structural diagram of a display panel provided by an embodiment of the present disclosure. FIG. 3 is a timing sequence diagram of a driving method provided by an embodiment of the present disclosure. Referring to FIG. 1 to FIG. 3, the display panel 01 includes multiple shift registers 010. A trigger signal line 014 is connected to a shift register at the first level. A clock signal line 011 and an inverted clock signal line 012 are respectively connected to the shift registers at each level. A driving signal of the shift register 010 includes a trigger signal STVn and clock signals CKn, XCKn.

The multiple level shift registers 010 are cascaded. The trigger signal STVn is used for triggering the shift register at the first level to operate, and the clock signals CKn and XCKn are used for determining the timing of an output pulse signal within an effective action duration of the trigger signal. The output pulse signal is used as the scan signal of the current level and also used as the trigger signal of the next level.

Based on the above, the driving method of the display panel includes steps described below.

In step S110, a current frames per second (PFS) in a current display mode is acquired.

The PFS refers to the number of frames refreshed per second and may also be understood as refresh number per second of a graphics processor. For an animation, the FPS refers to the frames of a still image displayed per second. When capturing moving display content, the higher the FPS, the greater the dynamic effect.

For example, the FPS may be 60 Hz, 90 Hz, 120 Hz, 144 Hz or other values known to those skilled in the art, which is not limited in the embodiment of the present disclosure.

The current FPS refers to the number of screens refreshed per second in the current display mode. In the embodiment, the FPS is used as an index for distinguishing display modes, that is, the FPSs are different in different display modes.

Taking a mobile phone or computer as an example, step S110 may include a following step: a Timing Controller (TCON) acquires the current FPS in the current display mode from a main control chip (or called as a main board).

In other implementations, step S110 may also be executed by other chips or modules known to those skilled in the art, which is not limited in the embodiment of the present disclosure.

In step S120, a current trigger signal and a current clock signal of the shift register are determined according to the current FPS.

For example, step S120 may include a following step: the timing control chip determines the current trigger signal and the current clock signal according to the current FPS.

In other implementations, step S120 may also be executed by other chips or modules known to those skilled in the art, which is not limited in the embodiment of the present disclosure.

A refresh frequency of the current trigger signal is the same as the current FPS, the current clock signal is the same as a reference clock signal in a reference display mode at least within the effective action duration of the current trigger signal, and the current FPS is less than or equal to a reference FPS in the reference display mode. Thus, the FPS may be switched from a high frequency to any low frequency without changing the clock signal.

For example, the refresh frequency of the trigger signal is the number of occurrences of an enable signal of the trigger signal in one second. Frame refresh is triggered once when the enable signal of the trigger signal occurs. Through setting the refresh frequency of the current trigger signal to be the same as the current FPS, different refresh frequencies of the trigger signals may be used for implementing different frame refresh rates.

For example, the clock signals are the same, so that the pulse widths of the scan signals output by the shift register are the same. Therefore, through configuring the current clock signal to be the same as the reference clock signal at least within the effective action duration of the current trigger signal, the pulse width of a current scan signal output at least within the effective duration of the current trigger signal is the same as the pulse width of a reference scan signal. Thus, the gamma data and the demura data in the reference display mode may be utilized in the current display mode without downloading the data again, the influence of frequency switching on the display screen may be avoided, and the user experience is improved. Meanwhile, it is not required to perform the gamma adjustment with respect to respective FPSs in the production process of the display panel, so that the debugging time is shortened, and the time cost of production of a production line is reduced.

For example, taking a line scan mode as an example, the effective action duration of the current trigger signal may be understood as a period during which the scan lines are scanned from the first line to the last line in the current display mode. This will be described in detail hereinafter.

Figure 4:
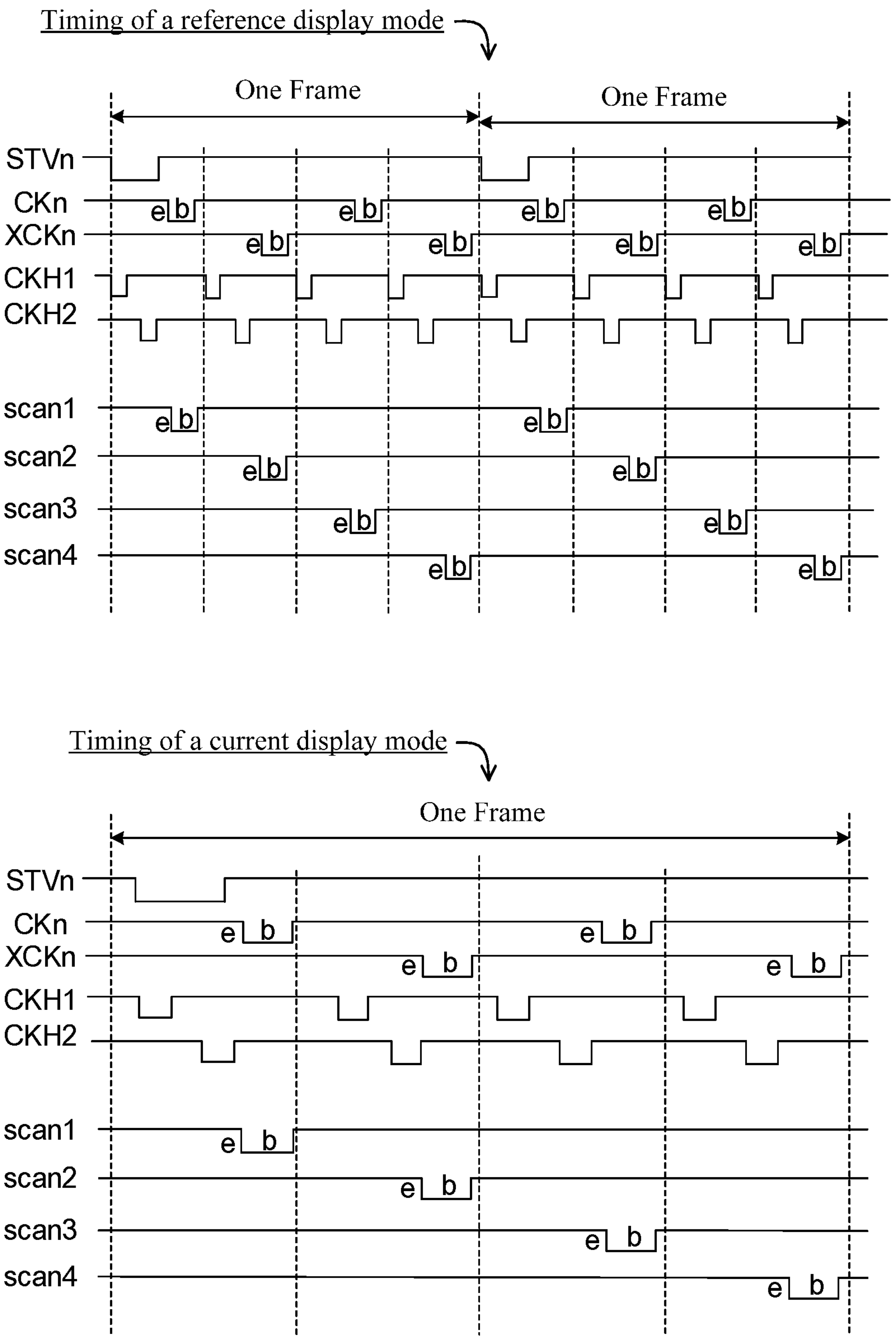
FIG. 4 is a timing sequence diagram of a driving method provided by the related art.

For example, FIG. 3 is a schematic diagram illustrating a comparison between the timing sequence of the current display mode and the timing sequence of the reference display mode in the driving method provided by the embodiment of the present disclosure. FIG. 4 is a schematic diagram illustrating a comparison between the timing sequence of the current display mode and the timing sequence of the reference display mode in the driving method provided by the related art. In FIG. 3 and FIG. 4, The FPS in the reference display mode is greater than the FPS in the current display mode.

In the related art, when the reference display mode is switched to the current display mode, each signal changes relative to signals in the reference mode. For example, the duration of each pulse and the duration of each pulse interval increase.

On the contrary, in the driving method provided by the embodiment, when the reference display mode is switched to the current display mode, at least within the effective action duration of the trigger signal, the current clock signal is the same as the reference clock signal, and other current signals are respectively the same as other reference signals. The drive signal of the shift register differs in that the refresh frequencies of the trigger signal respectively correspond to different FPSs in different display modes. Therefore, not only the pulse width of the clock signal but also the pulse interval does not change within the effective action duration of the current trigger signal. Thus, it is advantageous to simplify the algorithm.

It should be noted that FIG. 2 shows an example in which a vertical shift register (VSR) is used for showing a scan drive circuit. In other implementations, a horizontal shift register may also be provided, which is not limited in the embodiment of the present disclosure. FIG. 3 and FIG. 4 show an example in which a low level signal is the enable signal. In other implementations, a high level signal may be used as the enable signal, which is not limited in the embodiment of the present disclosure.

In step S130, the shift register is provided with the current trigger signal and the current clock signal.

For example, the current trigger signal is provided to the shift register at the first level, and the current clock signal is provided to shift registers at each level.

For example, a timing control circuit may be used for executing step S130.

For example, in synchronization with step S130, a data line may be provided with a data signal matching with the timing of the current trigger signal and the current clock signal in step S130, to display a screen in the current display mode. This will be described in detail hereinafter.

For example, when the display panel is the OLED display panel, the current trigger signal and the current clock signal in step S120 further includes a timing sequence signal related to a light-emitting control line in addition to the timing sequence signal related to the scan line. This is not limited in the embodiment of the present disclosure.

Figure 5:
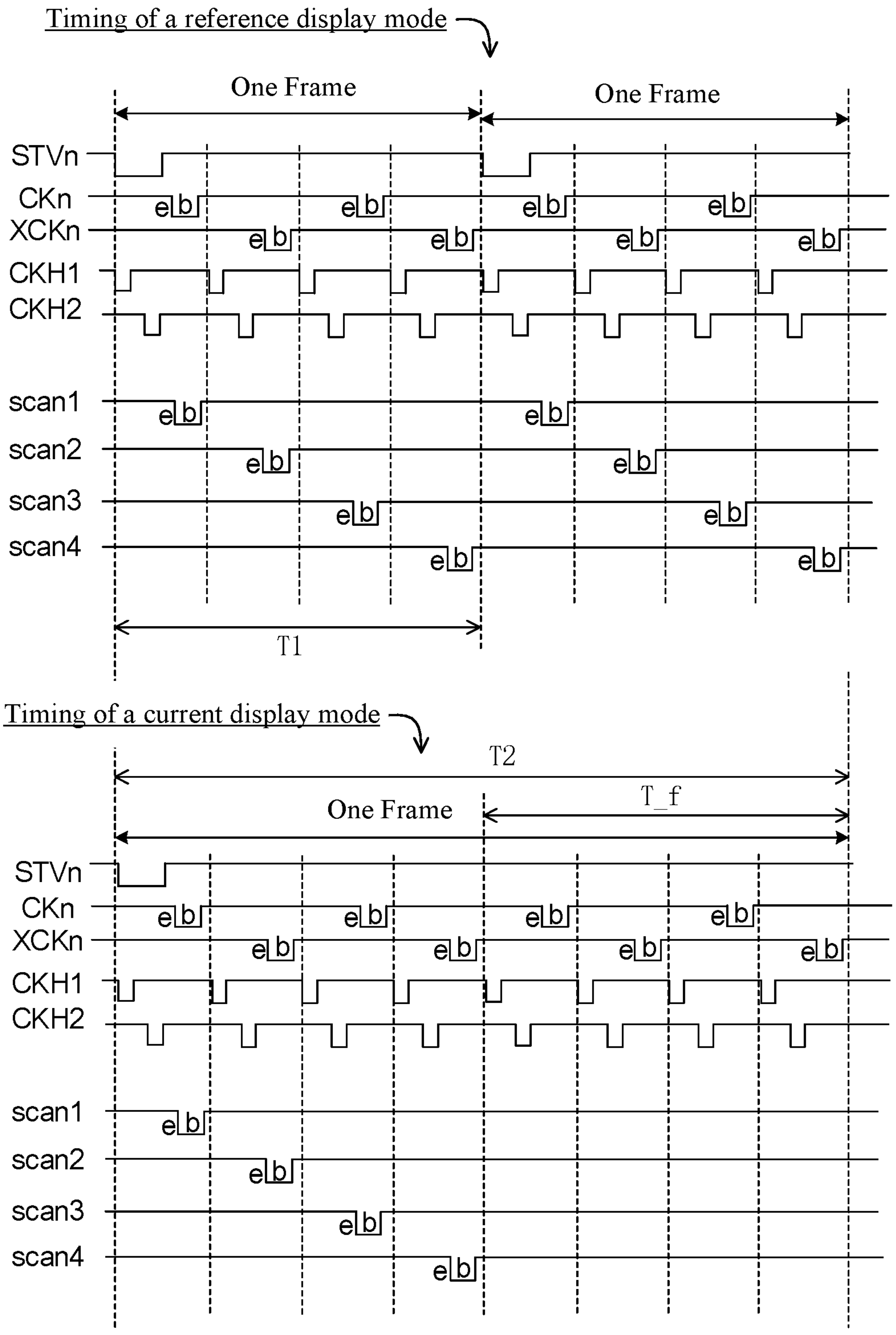
FIG. 5 is another timing sequence diagram of a driving method provided by an embodiment of the present disclosure.

Optionally, FIG. 5 is another timing sequence diagram of a driving method provided by an embodiment of the present disclosure. Referring to FIG. 5, within the period of a frame in the current display mode, the current clock signals are the same as the reference clock signals in the reference display mode.

Accordingly, when the FPS is switched from a high frequency to any low frequency, only the refresh frequency of the trigger signal is changed, while the waveforms of the other signals maintain uniform for respective FPSs. Therefore, it is not required to download not only the gamma data and the demura data at low FPS but also timing sequence signals at low FPS other than the trigger signal, that is, initialization codes other than the reference trigger signal in the reference display mode may be shared as the codes of the current display mode. Thus, the time for downloading the codes is saved, and the driving method is simple and easy to be executed.

Figure 6:
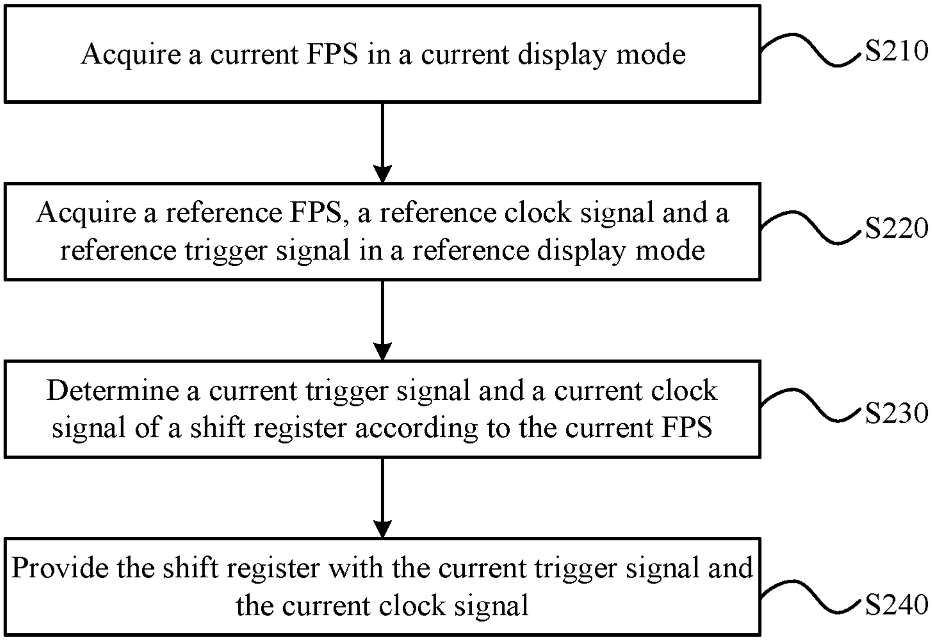
FIG. 6 is a flowchart of another driving method of a display panel provided by an embodiment of the present disclosure.

Optionally, FIG. 6 is a flowchart of another driving method provided by an embodiment of the present disclosure. The driving method shown in FIG. 6 is more detailed than the driving method shown in FIG. 1. Referring to FIG. 6, the driving method includes steps described below.

In step S210, a current FPS in a current display mode is acquired.

In step S220, a reference FPS, a reference clock signal and a reference trigger signal in a reference display mode are acquired.

The reference FPS is the number of screens refreshed per second in the reference display mode, and the refresh frequency of the reference trigger signal is the same as the reference FPS. The reference trigger signal and the reference clock signal together determine the waveform of the reference scan signal in the reference display mode.

Step S220 is used for preparing for the subsequent display of screen in the current display mode.

The reference FPS may be the same as the current FPS, or the reference FPS may be greater than the current FPS. Thus, the FPS may be switched from a high frequency to any low frequency. The highest FPS achieved by the driving method the FPS in the reference display mode.

In step S230, a current trigger signal and a current clock signal of a shift register are determined according to the current FPS.

In step S240, the shift register is provided with the current trigger signal and the current clock signal.

Thus, the FPS may be switched from a high frequency to any low frequency without changing the clock signal.

Optionally, the current FPS is f, the reference FPS is Fb, an effective action duration of the reference trigger signal is T1, the continuous action duration of the current trigger signal is T2, and a difference between T1 and T2 is idle duration T_f. T_f is calculated according to the following equation (1):

$$T\_f=(Fb/f-1)*T1 \quad (1)$$

The current clock signal is the same as the reference clock signal, and the trigger signal of the current display mode is different from the trigger signal of the reference display mode. The current trigger signal and the reference trigger signal are used for distinguished the trigger signals in different display modes. Therefore, in an actual display process, the effective action duration of the current trigger signal is the same as the effective action duration of the reference trigger signal, and both of them may be represented as T1. Thus, the idle duration T_f may be understood as at least one of signal hold duration of the image frame where the current trigger signal is located or signal hold duration of the previous image frame. The idle duration T_f may be determined according to chronological order between the idle duration T_f and the effective action duration of the reference trigger signal T1. This will be described by way of examples.

Optionally, the idle duration T_f may be a continuous duration to be inserted into an initial period or an end period of a frame in the current display mode.

For example, continuing to refer to FIG. 5, the idle duration T_f is inserted into the end period of the current image frame. For example, the reference FPS in the reference display mode is 120 Hz, and the duration of one frame in the reference display mode is the effective action duration, then the duration of one frame in the reference display mode is T1, and the idle duration T_f is inserted after the effective duration of the reference trigger signal to constitute the continuous action duration T2 of the current trigger signal.

For example, if the current FPS is 60 Hz, T_f=(1/60−1/120)/(1/120)*T1=T1.

If the current FPS is 30 Hz, T_f=(1/30−1/120)/(1/120)*T1=3*T1.

If the current FPS is 90 Hz, T_f=(1/90−1/120)/(1/120)*T1=T1/3.

If the current FPS is f, T_f=(1/f−1/120)/(1/120)*T1−(120/f−1)*T1.

If the reference FPS is Fb, T_f=(1/f−1/Fb)/(1/Fb)*T1−(Fb/f−1)*T1.

For example, the reference FPS is 120 Hz and the current FPS is 60 Hz, the effective action duration of the current trigger signal and the idle duration respectively occupy half of the duration of one frame. Within the first half part of the current image frame, namely within the effective action duration of the trigger signal, the shift register is provided with signals according to the signals with the FPS of 120 Hz, thus the display effect of the current display mode is the same as the display effect of the reference display mode. Within the latter half part of the current image frame, namely within the idle duration T_f, because the current trigger signal is not enabled on any more, the scan timing maintains at the level at the end of the effective action duration, and the pixel in the display panel maintains in a light-emitting state.

Figure 7:
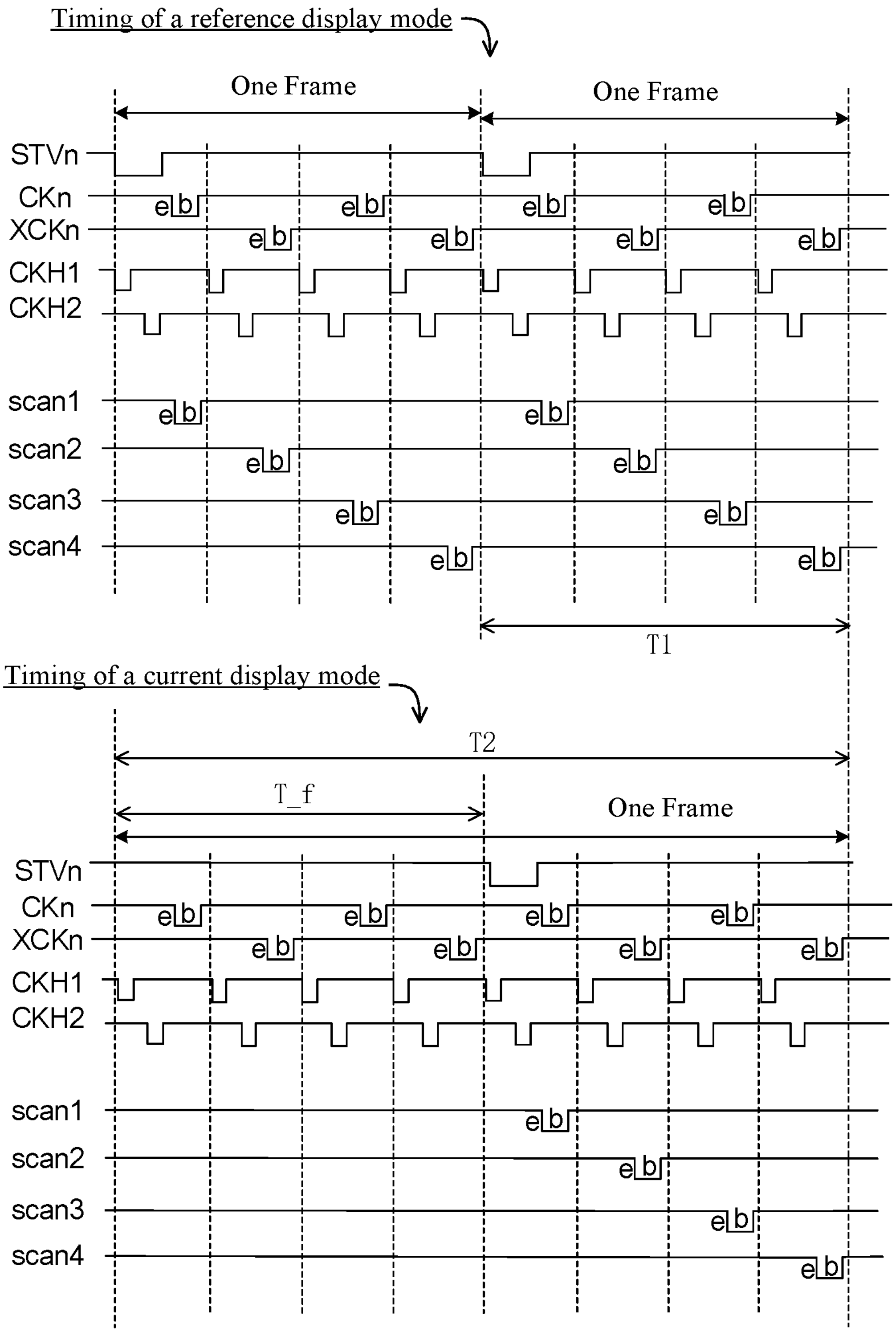
FIG. 7 is another timing sequence diagram of a driving method provided by an embodiment of the present disclosure.

For example, referring to FIG. 7, the idle duration T_f is inserted into the initial period of the current image frame, where the reference FPS is 120 Hz and the current FPS is 60 Hz. The first half part of the current image frame maintains the light-emitting state of the pixel in the display panel in the previous frame. In the latter half part of the current image frame, namely in the effective action duration of the current trigger signal, the shift register is provided with signals according to the signals with the FPS of 120 Hz. Thus, the display effect of the current display mode is the same as the display effect of the reference display mode.

For example, the idle duration T_f may be divided into two parts, that is, the idle duration T_f may be composed of a first sub idle duration T_f1 and a second sub idle duration T_f2. The first sub idle duration T_f1 and the second sub idle duration T_f2 are inserted into the initial period and the end period of the frame in the current display mode, respectively.

Figure 8:
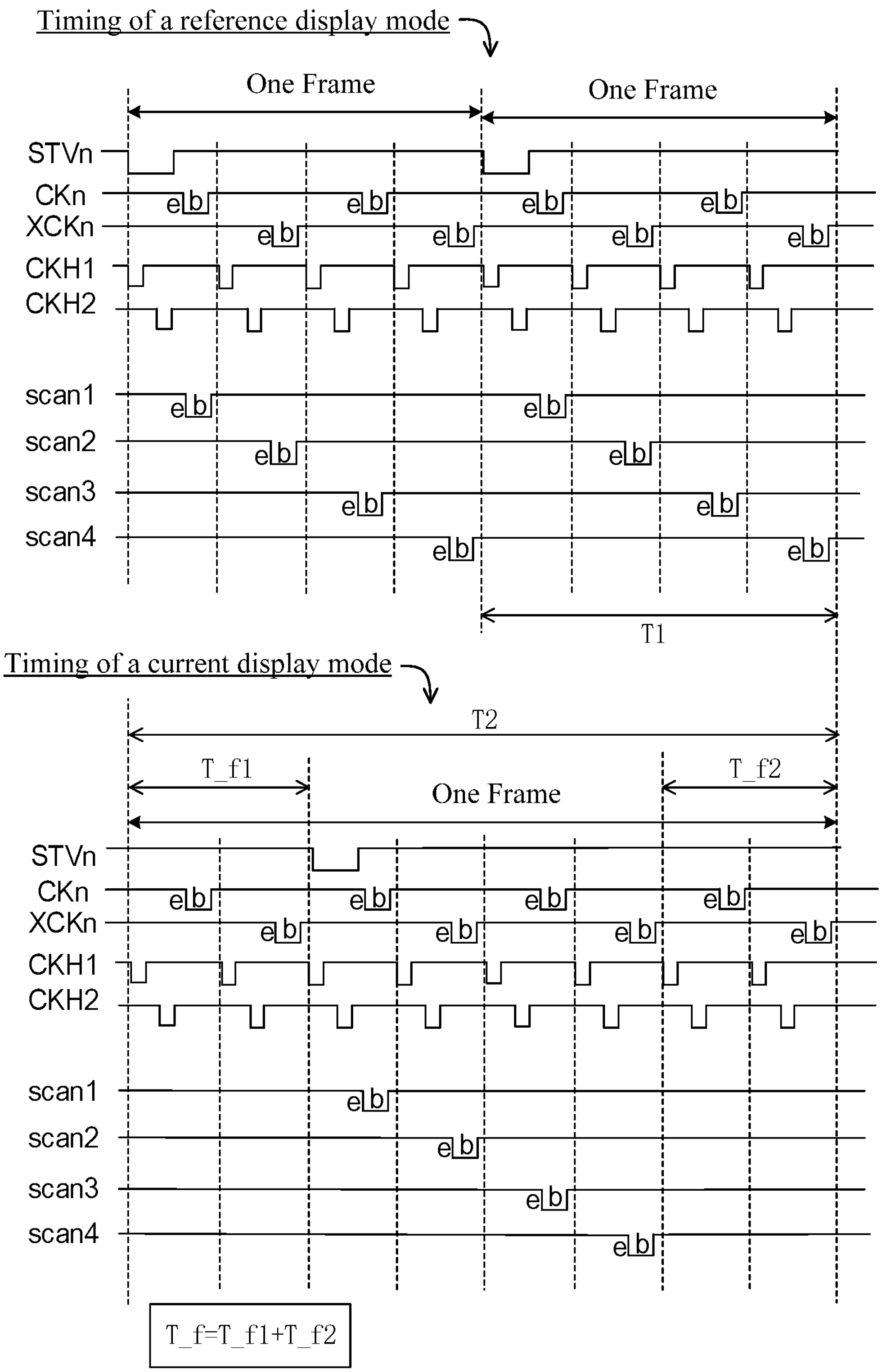
FIG. 8 is another timing sequence diagram of a driving method provided by an embodiment of the present disclosure.
Figure 9:
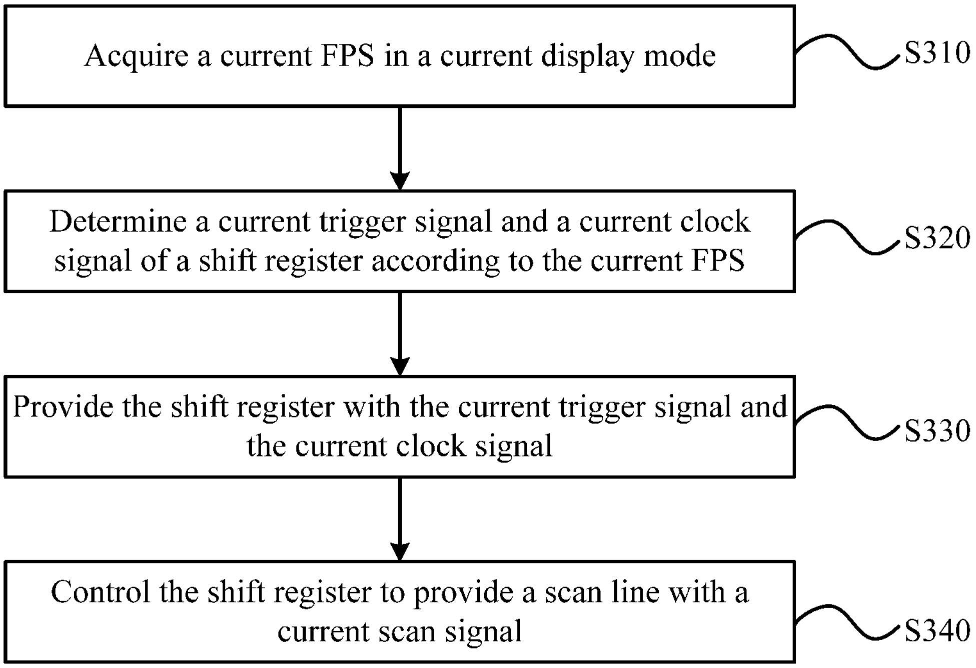
FIG. 9 is a flowchart of another driving method of a display panel provided by an embodiment of the present disclosure.

For example, referring to FIG. 8, the first sub idle duration T_f1 is inserted into the initial period of the current image frame. In the initial period of the current image frame, the pixel in the display panel maintains the light-emitting state of the previous frame. In the middle period of the current image frame, that is, the effective action duration of the current trigger signal, the shift register may be provided with signals according to the signals with the FPS of 120 Hz. Thus, the display effect of the current display mode is the same as the display effect of the reference display mode. Furthermore, in the second sub idle duration T_f2, as the current trigger signal is not enabled any more, the scan timing maintains the level at the end of the effective action duration, and the pixel in the display panel maintains the light-emitting state.

It should be noted that the first sub idle duration T_f1 and the second sub idle duration T_f2 may be configured according to actual requirements of the driving method of the display panel. The first sub idle duration T_f1 may be equal to the second sub idle duration T_f2, the first sub idle duration T_f1 may be longer than the second sub idle duration T_f2, or the second sub idle duration T_f2 may be longer than the first sub idle duration T_f1. This is not limited in the embodiments of the present disclosure.

The chronological order between the idle duration T_f1 and the effective action duration of the current trigger signal is described above with reference to FIG. 5, FIG. 7 and FIG. 8.

It should be noted that FIG. 3, FIG. 4, FIG. 5, FIG. 7, and FIG. 8 show four scan signals indicated as scan 1, scan 2, scan 3, and scan 4 respectively. In other implementations, the number of the scan signals may be set according to actual requirements of the display panel and the driving method thereof, which is not limited in the embodiment of the present disclosure.

Hereinafter, the driving method provided by the embodiment of the present disclosure will be described in conjunction with the scan lines and the data lines in the display panel, that is, in conjunction with the scan signals and the data signals.

Optionally, continuing to refer to FIG. 2, the display panel 01 further includes multiple scan lines 020. Based on this, referring to FIG. 9, the driving method may include steps described below.

In step S310, a current FPS in a current display mode is acquired.

In step S320, a current trigger signal and a current clock signal of a shift register are determined according to the current FPS.

In step S330, the shift register is provided with the current trigger signal and the current clock signal.

In step S340, the shift register is controlled to provide a scan line with a current scan signal.

The output signal of the shift register at each level is used as the scan signal of the scan line on one hand, and also used as the trigger signal of the shift register at the next level on the other hand.

The current scan signal is the same as the reference scan signal in the reference display mode within the effective action duration of the current trigger signal.

For example, referring to any one of FIG. 3, FIG. 5, FIG. 7 and FIG. 8, the pulse width and the pulse interval of the current scan signal are the same as that of the reference scan signal within the effective action duration of the current trigger signal, so that the brightness of the pixel in the display panel is substantially unchanged. Under the condition that the brightness is unchanged, when the reference FPS is different from the current FPS, the same gamma data and demura data may be still adopted for the reference display mode and the current display mode. Thus, the problem that multiple sets of data need to be provided when switching between multiple frequencies (namely multiple FPSs) can be solved.

Optionally, continuing to refer to FIG. 2, the display panel 01 further includes multiple data lines 030. Based on this, referring to FIG. 10, the driving method may include steps described below.

In step S410, a current FPS in a current display mode is acquired.

In step S420, a data line is provided with a current data signal.

The current data signal is the same as the reference data signal in the reference display mode at least within the effective action duration of the current trigger signal.

For example, the current data signal is the same as the reference data signal only within the effective duration of the current trigger signal. Thus, the supply of the data signal to the data line may be stopped in the idle duration, and the power consumption of the display panel may be reduced.

For example, the current data signals are the same as the reference data signals within the continuous duration of the current trigger signal. Thus, the current display mode may fully utilize the data signal of the reference display mode without providing a new data signal, which is advantageous to simplify the driving algorithm.

It should be understood that, the expression “the data signals are set to be the same at different FPSs” described above means that the timings of the data signals are the same. The magnitude of the data signals may be set according to actual display requirements of the display panel, which is not limited in the embodiment of the present disclosure.

In step S430, a current trigger signal and a current clock signal of the shift register are determined according to the current FPS.

In step S440, the shift register is provided with the current trigger signal and the current clock signal.

Figure 10:
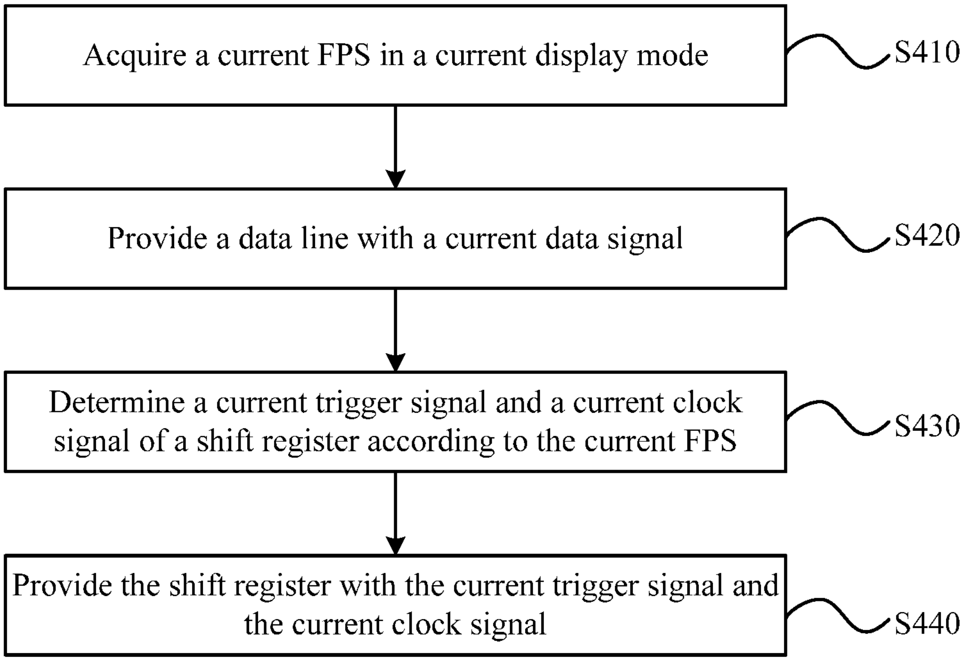
FIG. 10 is a flowchart of another driving method of a display panel provided by an embodiment of the present disclosure.

For example, step S420 is before step S430 in FIG. 10. In the actual driving process of the display panel, the data signal and the scan signal cooperate to implement the luminescence of the pixel. Based on this, according to actual requirements of the driving method, step S420 may also be configured after step S440, in parallel with step S440, or in other execution sequences known to those skilled in the art. This is not limited in the embodiment of the present disclosure.

Optionally, referring to any one of FIG. 3, FIG. 5, FIG. 7 and FIG. 8, a relative position relationship between a leading edge (which is shown as e) and a pulse width (which is shown as b) of the current scan signal provided for the scan line and the waveform of the current data signal in the current display mode is the same as a relative position relationship between a leading edge (which is shown as e) and a pulse width (which is shown as e) of the reference scan signal provided for the scan line and the waveform of the reference data signal in the reference display mode. When the FPS is switched, the waveforms of the data signal and the clock signal may maintain consistent among the multiple frequencies, namely the pulse widths are not changed, and the relative position between the waveform of the clock signal and the waveform of the data signal is unchanged. Only the timings of the trigger signals are different, to match with the respective FPSs.

Therefore, when the FPS is switched from a high frequency to any low frequency, the display effect is not affected, and the user experience is improved. Meanwhile, in addition to the trigger signal, the codes corresponding to the signals related to other timings do not need to be downloaded, and the driving method and the driving flow are simplified.

Optionally, continuing to refer to FIG. 2, the display panel 01 further includes multiple multiplexers (DEMUXs, which is shown as DMX in FIG. 2) 040. Each of the multiple DEMUXs 040 may include an input terminal, an output terminal, a first control terminal and a second control terminal. The input terminal is electrically connected to a data input signal line 033. The first control terminal is electrically connected to a first control signal line 031. The second control terminal is electrically connected to a second control signal line 032. The output terminal of the DEMUX 040 is electrically connected to the data line 030 to provide the data line 030 with the data signal.

In this way, the input signals provided by the data input signal lines 033 may be time-division multiplexed by the DEMUXs 040, so as to form the data signals provided for the data lines 030. This is advantageous to reduce the number of the data input signal lines 033, reduce the number of pins of the integrated circuit electrically connected to the data input signal lines 033, and reduce the cost of the integrated circuit. Thus, it is advantageous to reduce the overall cost of the display panel.

For example, each of the multiple DEMUXs 040 shown in FIG. 2 includes two control terminals, that is, 1-to-2 DEMUX 040 is formed.

In other implementations, the number of the control terminals of the DEMUX 040 may be three or more, that is, 1-to-more DEMUX 040 may be provided. The number of the control terminals of the DEMUX 040 may be configured according to actual requirements of the display panel and the driving method thereof, which is not limited in the embodiment of the present disclosure.

For example, in FIG. 2, the scan lines 020 and the data lines 030 are arranged in a crossed way, so as to define pixel units 050 arranged in an array. FIG. 2 shows an example of the pixel units 050 with 11 rows and 7 columns, which is only a partial structure of the display panel 01. In an actual product structure, the number of the pixel units 050 and the arrangement of the rows and columns may be configured according to actual requirements of the display panel 01. This is not limited in the embodiment of the present disclosure.

Based on the above, referring to FIG. 11, the driving method may include steps described below.

In step S510, the current FPS in the current display mode is acquired.

In step S520, the DEMUX is provided with a current input signal and a current timing control signal.

The current input signal is the same as a reference input signal in the reference display mode at least within the effective action duration of the trigger signal. The current timing control signal is the same as a reference timing control signal in the reference display mode at least within the effective action duration of the trigger signal.

Thus, it may be implemented that the current data signal is the same as the reference data signal in the reference display mode at least within the effective action duration of the current trigger signal.

In step S530, the current trigger signal and the current clock signal of the shift register are determined according to the current FPS.

In step S540, the shift register is provided with the current trigger signal and the current clock signal.

Figure 11:
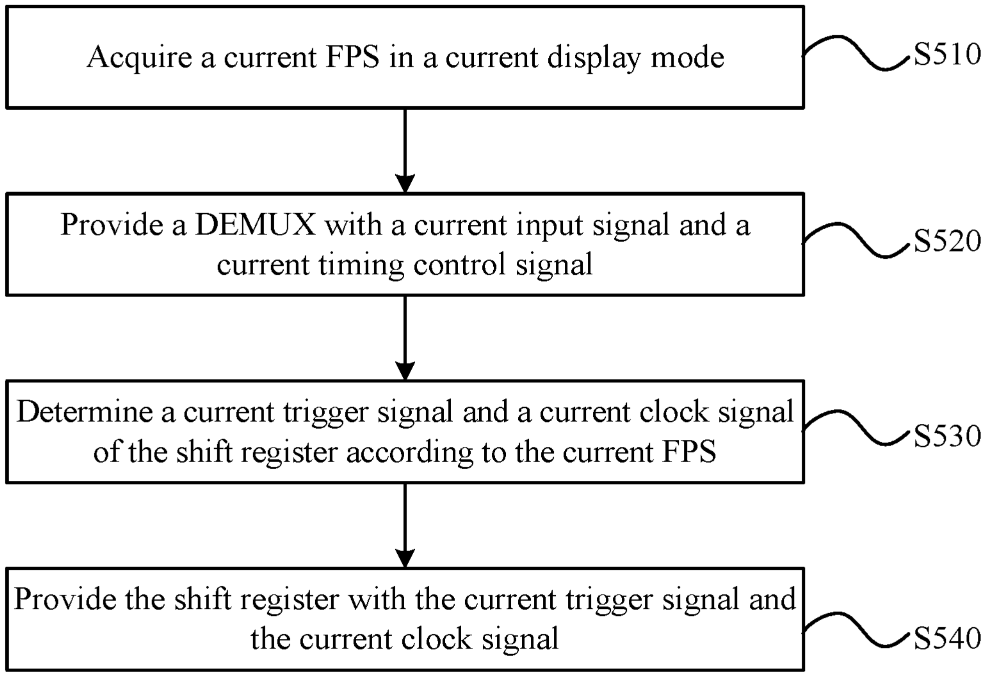
FIG. 11 is a flowchart of another driving method of a display panel provided by an embodiment of the present disclosure.

It should be noted that FIG. 11 shows an example in which step S520 is before step S530. In the actual driving process of the display panel, the data signal and the scan signal cooperate to implement the luminescence of the pixel. Based on this, step S520 may also be configured after step S540, in parallel with step S540, or in other execution sequences known to those skilled in the art. This is not limited in the embodiment of the present disclosure.

Based on the same inventive conception, an embodiment of the present disclosure further provides a display driving device, which may be configured to execute the driving method provided by the above embodiment. Thus, the display panel may still display graphics to be displayed when the FPS is switched, to avoid abnormal display. The display driving device also has the advantages of the driving method of the display panel provided by the above embodiment, and the same is not described in detail hereinafter, which may be understood by reference to the above.

Figure 12:
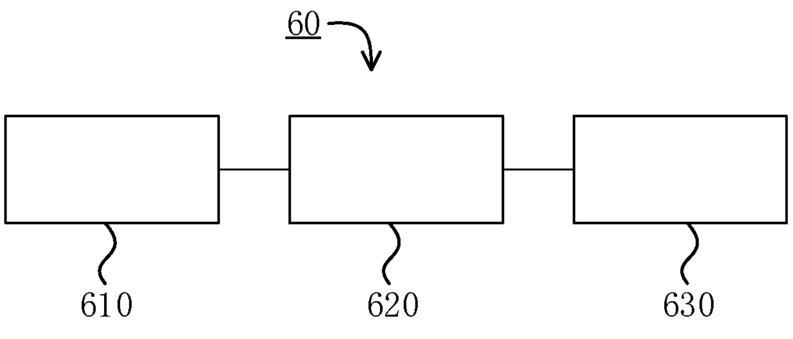
FIG. 12 is a structural diagram of a display driving device provided by an embodiment of the present disclosure.

For example, FIG. 12 is a structural diagram of a display driving device provided by an embodiment of the present disclosure. Referring to FIG. 12, the display driving device 60 includes a current mode acquisition circuit 610, a control signal determination circuit 620 and a control signal providing circuit 630. The current mode acquisition circuit 610 is configured to acquire the current FPS in the current display mode. The control signal determination circuit 620 is configured to determine the current trigger signal and the current clock signal of the shift register according to the current FPS. The control signal providing circuit 630 is configured to provide the shift register with the current trigger signal and the current clock signal.

The refresh frequency of the current trigger signal is the same as the current FPS, the current clock signal is the same as the reference clock signal in the reference display mode at least within the effective action duration of the current trigger signal, and the current FPS is less than or equal to the reference FPS in the reference display mode. Thus, the FPS may be switched from a high frequency to any low frequency without changing the clock signal, and the pulse widths of the scan signals output from the shift register at the respective FPSs are the same.

Therefore, the pulse width of the current scan signal output at least within the effective duration of the current trigger signal is the same as the pulse width of the reference scan signal, so that the gamma data and the demura data of the reference display mode may be utilized in the current display mode without downloading the data again, the effect of frequency switching on the display screen may be avoided, and the user experience is improved. Meanwhile, the gamma adjustment is not required for respective FPSs in the production process of the display panel, so that the debugging time is shortened, and the time cost of the production of the production line is reduced.

Figure 13:
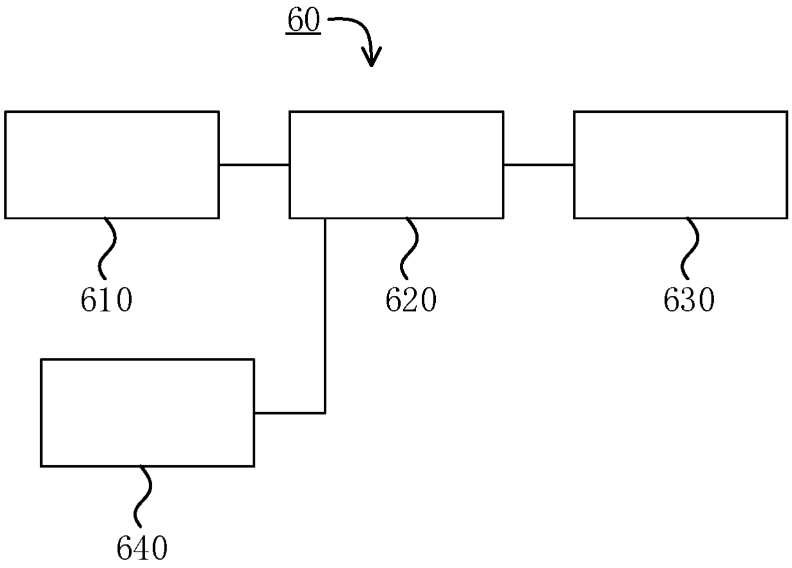
FIG. 13 is a structural diagram of another display driving device provided by an embodiment of the present disclosure.

Optionally, FIG. 13 is a structural diagram of another display driving device provided by an embodiment of the present disclosure. Referring to FIG. 13, on the basis of FIG. 12, the display driving device 60 may further include a reference mode acquisition circuit 640. The reference mode acquisition circuit 640 is configured to acquire the reference FPS, the reference clock signal and the reference trigger signal in the reference display mode.

For example, the reference mode acquisition circuit 640 is electrically connected to the control signal determination circuit 620, so as to provide referable initial codes for determining the current trigger signal and the current clock signal in the current display mode.

Figure 14:
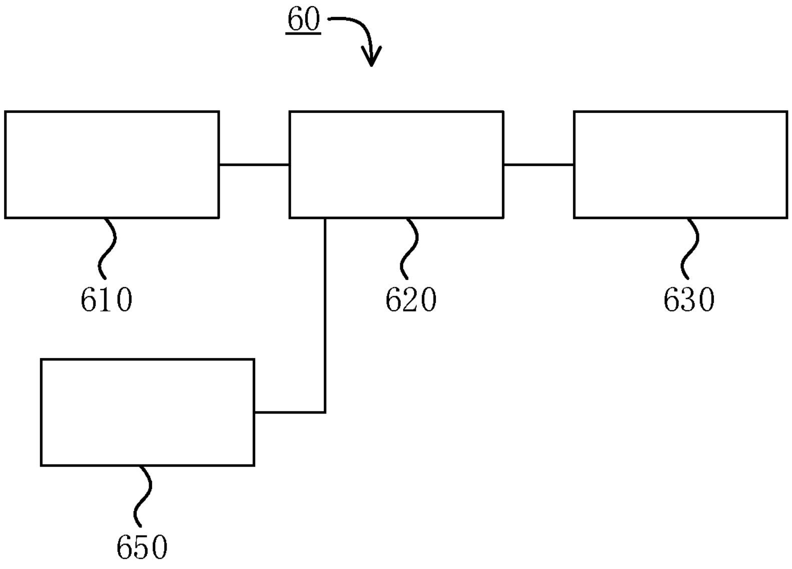
FIG. 14 is a structural diagram of another display driving device provided by an embodiment of the present disclosure.

Optionally, FIG. 14 is a structural diagram of another display driving device provided by an embodiment of the present disclosure. Referring to FIG. 14, on the basis of FIG. 12, the display driving device 60 may further include an idle duration insertion circuit 650. The idle duration insertion circuit 650 is configured to insert the idle insertion T_f into the initial period or the end period of a frame in the current display mode. The current FPS is f, the reference FPS is Fb, the effective action duration of the reference trigger signal is T1, and the continuous action duration of the current trigger signal is T2. The difference between T1 and T2 is the idle duration T_f, and T_f=(Fb/f−1)*T1.

For example, the idle duration insertion circuit 650 is electrically connected to the control signal determination circuit 620, so that the idle duration may be inserted into the timing of the reference trigger signal to form the current trigger signal.

For example, the chronological order between the idle duration and the effective action duration of the current trigger signal may be understood by referring to FIG. 5, FIG. 7, FIG. 8 and the related explanation described above, and is not described in detailed herein.

Figure 15:
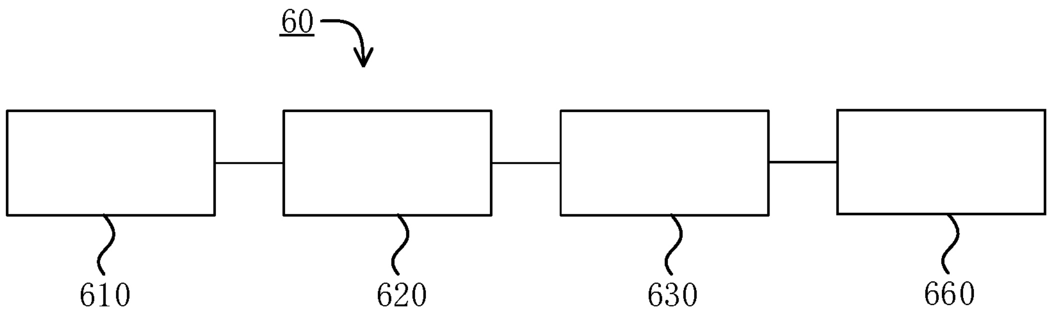
FIG. 15 is a structural diagram of another display driving device provided by an embodiment of the present disclosure.

Optionally, FIG. 15 is a structural diagram of another display driving device provided by an embodiment of the present disclosure. Referring to FIG. 15, on the basis of FIG. 12, the display driving device 60 may further include a scan signal providing circuit 660. The scan signal providing circuit 660 is configured to provide the scan line with the current scan signal. The current scan signal is the same as the reference scan signal in the reference display mode within the effective action duration of the trigger signal.

Thus, the scan signals at different FPSs may be the same. For example, the pulse widths of the scan signals are the same and the durations of the pulse intervals are the same.

For example, the scan signal providing circuit 660 is electrically connected to the output terminal of the control signal providing circuit 630. The scan signal providing circuit 660 is electrically connected to respective level scan lines in the display panel, and may provide the scan lines with the scan signals level by level.

Optionally, the scan signal providing circuit 660 is the shift register.

For example, the shift register may be the vertical shift register or the horizontal shift register. The shift register may be arranged in a peripheral circuit region of the periphery surrounding the display region.

Figure 16:
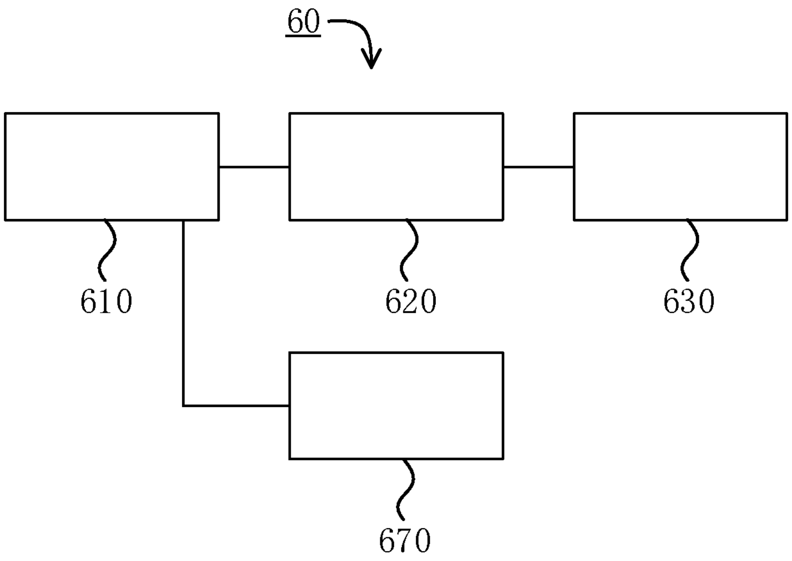
FIG. 16 is a structural diagram of another display driving device provided by an embodiment of the present disclosure.

For example, FIG. 16 is a structural diagram of another display driving device provided by an embodiment of the present disclosure. Referring to FIG. 16, on the basis of FIG. 12, the display driving device 60 may further include a data signal providing circuit 670. The data signal providing circuit 670 is configured to provide the data line with the current data signal. The current data signal is the same as the reference data signal in the reference display mode at least within the effective action duration of the trigger signal. The data signal providing circuit 670 may be electrically connected to the current mode acquisition circuit 610. The data signal providing circuit 670 determines data signals according to the current display mode and provides the data signals for the data lines.

Thus, a starting position of the scan signal relative to the position of the waveform of the data signal may be unchanged when the pulse widths of the scan signals are the same at different FPSs, that is, the waveforms of the data signals and the clock signals are the same at respective FPSs. Only the different refresh frequencies of the trigger signal are used for matching with the different FPSs.

Figure 17:
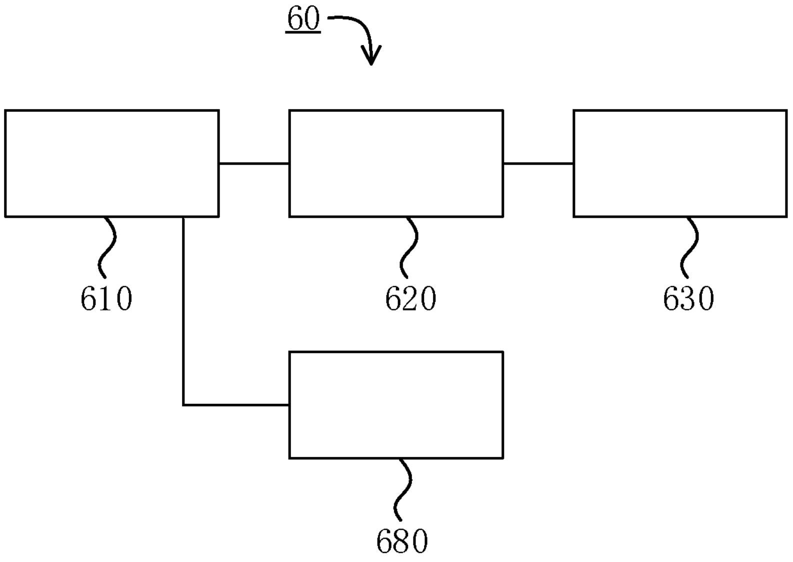
FIG. 17 is a structural diagram of another display driving device provided by an embodiment of the present disclosure.

For example, FIG. 17 is a structural diagram of another display driving device provided by an embodiment of the present disclosure. Referring to FIG. 17, on the basis of FIG. 12, the display driving device 60 may further include a multiplexer selection signal providing circuit 680. The multiplexer selection signal providing circuit 680 is configured to provide the multiplexer with the current input signal and the current timing control signal. The current input signal is the same as the reference input signal in the reference display mode at least within the effective action duration of the trigger signal. The current timing control signal is the same as the reference timing control signal in the reference display mode at least within the effective action duration of the trigger signal.

Thus, it may be implemented that the current data signal is the same as the reference data signal in the reference display mode at least within the effective action duration of the current trigger signal.

It should be noted that, in FIG. 12 to FIG. 17, only the functional blocks and the connection relations thereof in the display driving device are shown by way of example. In an actual product, the functional modules may be integrated, and information interaction among the functional modules may be wired transmission or wireless transmission. The display driving device may include any combination of the functional blocks shown in FIG. 12 to FIG. 17 in case of no conflict. This is not limited in the embodiment of the present disclosure.

On the basis of the above implementations, the embodiment of the present disclosure further provides an electronic apparatus. The electronic apparatus includes any one of the display driving device provided by the above implementations, so that the electronic apparatus also has the advantages of the display driving device provided by the above implementations, and the same is not described in detail hereinafter and may be understood by reference to the above.

Figure 18:
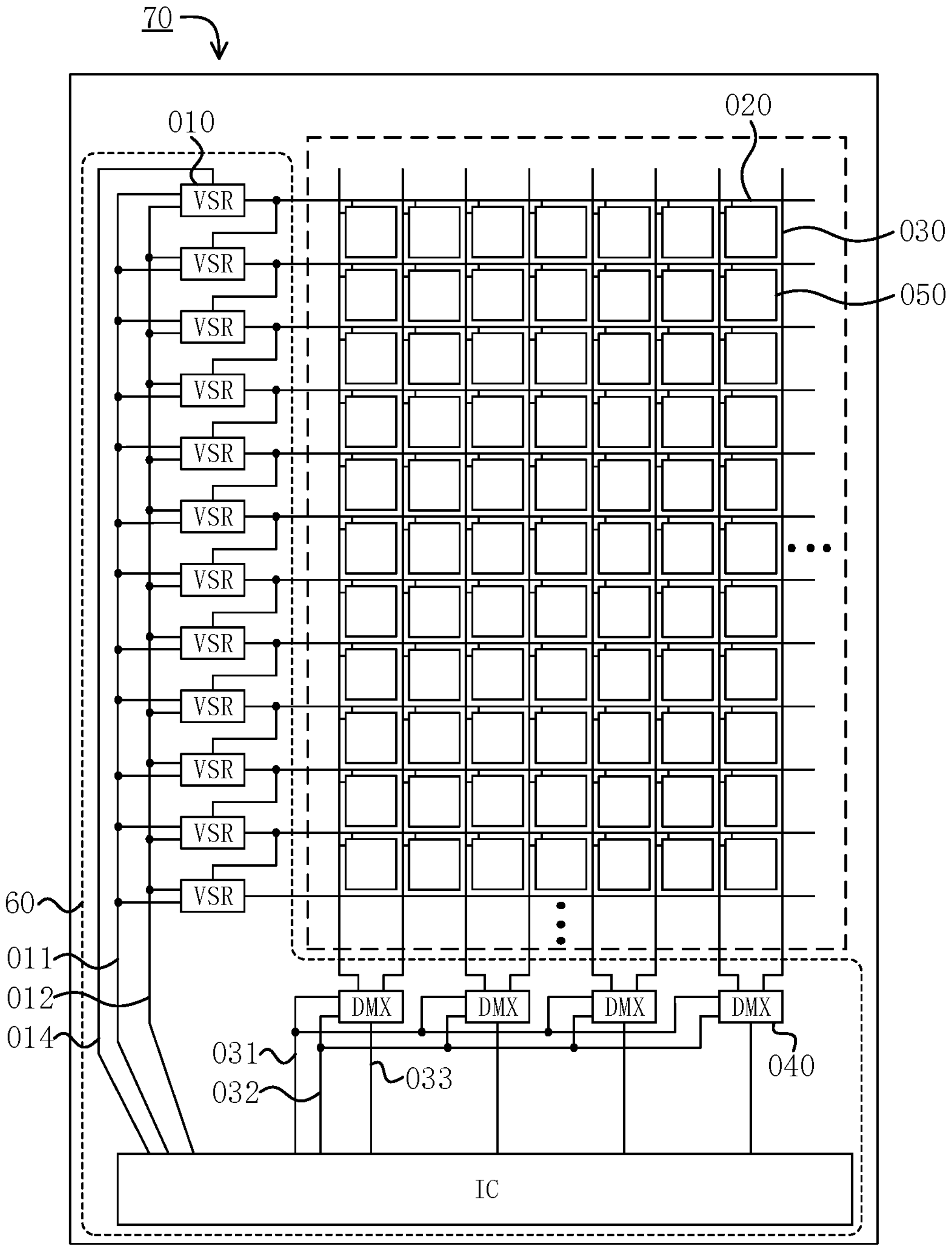
FIG. 18 is a structural diagram of an electronic apparatus provided by an embodiment of the present disclosure.

For example, FIG. 18 is a structural diagram of an electronic apparatus provided by an embodiment of the present disclosure. Referring to FIG. 18, the electronic apparatus 70 includes the display driving device 60 provided by the above implementations.

Optionally, the display driving device 60 includes an integrated circuit (IC), and may further include the shift register 010, the multiplexer 040, and other components or modules known to those skilled in the art. This not limited in the embodiment of the present disclosure.

For example, the electronic apparatus 70 may be a mobile phone, computer, smart wearable device (for example, a smart watch), vehicle-mounted display screen, vehicle-mounted touch screen, or other types of electronic apparatus known to those skilled in the art. This is not limited in the embodiment of the present disclosure.

It should be noted that the above are only exemplary embodiments of the present disclosure and technical principles applied in the present disclosure. Those skilled in the art will understand that the present disclosure is not limited to the specific embodiments described herein. For those skilled in the art, various obvious changes, readjustments and substitutions may be conducted without departing from the protection scope of the present disclosure. Therefore, although the present disclosure is described in detail through the above embodiments, without departing from the conception of the present disclosure, the present disclosure may include more equivalent embodiments. The scope of the present disclosure is determined by the scope of accompanying claims.

What is claimed is:

1. A display panel, comprising:

a plurality of pixels, a plurality of levels of shift registers which are cascaded, a clock signal line configured to transmit a clock signal and a trigger signal line configured to transmit a trigger signal, wherein the clock signal line is connected to the plurality of levels of shift registers, one terminal of the trigger signal line is electrically connected to a shift register at one level, and another terminal of the trigger signal is electrically connected to an integrated circuit;

wherein the display panel comprises a current display mode, and the current display mode comprises a current frames per second (FPS), a current trigger signal corresponding to the current FPS and a current clock signal corresponding to the current FPS, wherein the current FPS is the same as a refresh frequency of the current trigger signal;

wherein the display panel further comprises a reference display mode, and the reference display mode comprises a reference FPS, a reference trigger signal corresponding to the reference FPS and a reference clock signal corresponding to the reference FPS;

wherein a continuous action duration of the current trigger signal comprises an effective action duration and an idle duration, wherein the effective action duration of the current trigger signal is a duration for performing scanning on all of the plurality of pixels from a first line to a last line in the current display mode, and the idle duration of the current trigger signal is a duration in which all of the plurality of pixels maintain in a light-emitting state;

wherein within both the effective action duration and the idle duration in one frame period, a pulse width of the current clock signal for all of the plurality of pixels in the current display mode is the same as a pulse width of the reference clock signal for all of the plurality of pixels in the reference display mode;

wherein the effective action duration of the current trigger signal comprises a first stage; and wherein the current FPS is less than a reference FPS in the reference display mode.

2. The display panel of claim 1, wherein in the first stage, spacing between two adjacent pulses in the current clock signal is the same as spacing between two adjacent pulses in the reference clock signal.

3. The display panel of claim 1, wherein in the first stage, the current clock signal comprises a plurality of low-level signals, and the reference clock signal comprises a plurality of low-level signals, wherein a continuous duration of at least one low-level signal of the plurality of low-level signals of the current clock signal is the same as a continuous duration of at least one low-level signal of the plurality of low-level signals of the reference clock signal.

4. The display panel of claim 1, further comprising: an inverted clock signal line configured to transmit an inverted clock signal, wherein the inverted clock signal line is connected to the plurality of levels of shift registers;

wherein the current display mode further comprises a current inverted clock signal; the reference display mode further comprises a reference inverted clock signal; and in the first stage, a pulse width of the current inverted clock signal is the same as a pulse width of the reference inverted clock signal.

5. The display panel of claim 4, wherein within the continuous action duration of the current trigger signal a pulse width of the current inverted clock signal is the same as a pulse width of the reference inverted clock signal.

6. The display panel of claim 5, wherein the current FPS is f, the reference FPS is Fb, an effective action duration of the reference trigger signal is T1, the continuous action duration of the current trigger signal is T2, and a difference between T1 and T2 is an idle duration T_f, wherein $T\_f=(Fb/f-1)*T1$.

7. The display panel of claim 1, wherein the idle duration T_f is composed of a first sub idle duration and a second sub idle duration; and wherein the first sub idle duration and the second sub idle duration are inserted into an initial period and an end period of one frame period in the current display mode, respectively.

8. The display panel of claim 1, further comprising: a plurality of scan lines connected to the plurality of levels of shift registers;

wherein the shift register at the one level is configured to provide a scan line connected to the shift register at the one level with a current scan signal in the current display mode;

wherein the reference display mode further comprises a reference scan signal; and wherein the current scan signal is the same as the reference scan signal within the effective action duration of the current trigger signal.

9. The display panel of claim 8, wherein a pulse width of the reference clock signal is the same as a pulse width of the reference scan signal, and a pulse width of the current clock signal is the same as a pulse width of the current scan signal.

10. The display panel of claim 1, further comprising: a data signal;

wherein in the current display mode, the data signal is configured to transmit a current data signal, and in the reference display mode, the data signal is configured to transmit a reference data signal; and wherein a pulse width of the current data signal is the same as a pulse width of the reference data signal at least within the first stage.

11. The display panel of claim 10, further comprising: a plurality of scan lines connected to the plurality of levels of shift registers;

wherein the plurality of shift registers are configured to provide the plurality of scan lines with scan signals; and wherein a relative position relationship between a leading edge and a pulse width of a current scan signal provided for a scan line connected to the shift register at the one level and a waveform of the current data signal in the current display mode is the same as a relative position relationship between a leading edge and a pulse width of a reference scan signal provided for the scan line connected to the shift register at the one level and a waveform of the reference data signal in the reference display mode.

12. The display panel of claim 11, further comprising: a demultiplexer (DEMUX);

wherein in the current display mode, the DEMUX is provided with a current input signal and a current timing control signal;

wherein the current input signal is the same as a reference input signal in the reference display mode at least within the effective action duration of the current trigger signal, and the current timing control signal is the same as a reference timing control signal in the reference display mode at least within the effective action duration of the current trigger signal.

13. A method of driving a display panel, wherein the display panel comprises a plurality of pixels, a plurality of levels of shift registers which are cascaded, a clock signal line configured to transmit a clock signal and a trigger signal line configured to transmit a trigger signal; the clock signal line is connected to the plurality of levels of shift registers, one terminal of the trigger signal line is electrically connected to a shift register at one level, and another terminal of the trigger signal is electrically connected to an integrated circuit; and the method comprises:

acquiring a current frames per second (FPS) in a current display mode;

determining a current trigger signal and a current clock signal according to the current FPS;

providing the shift register at the one level with the determined current trigger signal and the determined current clock signal;

wherein a refresh frequency of the current trigger signal is the same as the current FPS;

wherein the continuous action duration of the current trigger signal comprises an effective action duration and an idle duration, wherein the effective action duration of the current trigger signal is a duration for performing scanning on all of the plurality of pixels from a first line to a last line in the current display mode, and the idle duration of the current trigger signal is a duration in which all of the plurality of pixels maintain in a light-emitting state;

wherein within both the effective action duration and the idle duration in one frame period, a pulse width of the current clock signal for all of the plurality of pixels in the current display mode is the same as a pulse width of the reference clock signal for all of the plurality of pixels in the reference display mode;

wherein at least within an effective action duration of the current trigger signal, and spacing between two adjacent pulses in the current clock signal is the same as spacing between two adjacent pulses in the reference clock signal; and wherein the current FPS is less than or equal to a reference FPS in the reference display mode.

14. The method of claim 13, wherein before determining the current trigger signal and the current clock signal according to the current FPS, the method further comprises:

acquiring the reference FPS, the reference clock signal and a reference trigger signal in the reference display mode;

wherein the current FPS is f, the reference FPS is Fb, the effective action duration of the reference trigger signal is T1, the continuous action duration of the current trigger signal is T2, and a difference between T1 and T2 is the idle duration T_f, and wherein T_f=(Fb/f−1)*T1.

15. The method of claim 13, wherein the display panel further comprises an inverted clock signal line configured to transmit an inverted clock signal, and the inverted clock signal line is connected to the plurality of levels of shift registers;

wherein determining the current trigger signal and the current clock signal according to the current FPS further comprises: determining a current inverted clock signal, and providing the shift register at the one level with the determined current inverted clock signal;

wherein at least within the effective action duration of the current trigger signal, a pulse width of the current inverted clock signal is the same as a pulse width of a reference inverted clock signal, and spacing between two adjacent pulses in the current inverted clock signal is the same as spacing between two adjacent pulses in the reference inverted clock signal.

16. The method of claim 13, wherein the display panel further comprises a plurality of scan lines connected to the plurality of levels of shift registers;

wherein after providing the shift register at the one level with the determined current trigger signal and the determined current clock signal, the method further comprises:

controlling the shift register at the one level to provide a scan line connected to the shift register at the one level with a current scan signal;

wherein the current scan signal is the same as a reference scan signal in the reference display mode within the effective action duration of the current trigger signal.

17. The method of claim 16, wherein the display panel further comprises a plurality of scan lines connected to the plurality of levels of shift registers;

wherein a relative position relationship between a leading edge and a pulse width of a current scan signal provided for a scan line connected to the shift register at the one level and a waveform of the current data signal in the current display mode is the same as a relative position relationship between a leading edge and a pulse width of a reference scan signal provided for the scan line connected to the shift register at the one level and a waveform of the reference data signal in the reference display mode.

18. The method of claim 17, wherein the display panel further comprises a demultiplexer (DEMUX); wherein after acquiring the current FPS in the current display mode, the method further comprises:

providing the DEMUX with a current input signal and a current timing control signal;

wherein the current input signal is the same as a reference input signal in the reference display mode at least within the effective action duration of the current trigger signal, and the current timing control signal is the same as a reference timing control signal in the reference display mode at least within the effective action duration of the current trigger signal.

19. The method of claim 13, wherein the display panel further comprises a data line; wherein after acquiring the current FPS in the current display mode, the method further comprises:

providing the data line with a current data signal;

wherein the current data signal is the same as a reference data signal in the reference display mode at least within the effective action duration of the current trigger signal.

* * * * *